(12) United States Patent
Saito et al.

(10) Patent No.: US 10,998,141 B2
(45) Date of Patent: May 4, 2021

(54) NEGATIVE ELECTRODE OF POWER STORAGE DEVICE AND POWER STORAGE DEVICE

(71) Applicant: SEMICONDUCTOR ENERGY LABORATORY CO., LTD., Atsugi (JP)

(72) Inventors: Yumiko Saito, Kanagawa (JP); Rie Yokoi, Kanagawa (JP); Mayumi Mikami, Kanagawa (JP)

(73) Assignee: Semiconductor Energy Laboratory Co., Ltd., Kanagawa-ken (JP)

( * ) Notice: Subject to any disclaimer, the term of this patent is extended or adjusted under 35 U.S.C. 154(b) by 0 days.

(21) Appl. No.: 16/840,659

(22) Filed: Apr. 6, 2020

(65) Prior Publication Data

US 2020/0234893 A1 Jul. 23, 2020

Related U.S. Application Data

(63) Continuation of application No. 14/937,975, filed on Nov. 11, 2015, now Pat. No. 10,614,967, which is a
(Continued)

(30) Foreign Application Priority Data

Aug. 31, 2011 (JP) ................................. 2011-189140

(51) Int. Cl.
*H01G 11/48* (2013.01)
*H01M 4/38* (2006.01)
(Continued)

(52) U.S. Cl.
CPC ............. *H01G 11/48* (2013.01); *H01G 11/30* (2013.01); *H01G 11/32* (2013.01); *H01G 11/50* (2013.01);
(Continued)

(58) Field of Classification Search
CPC ........ H01G 11/30; H01G 11/32; H01G 11/48; H01G 11/50; H01G 11/52; H01G 11/62;
(Continued)

(56) References Cited

U.S. PATENT DOCUMENTS 6,797,434 B1 9/2004 Matsubara et al.
7,303,838 B2 12/2007 Morita et al.
(Continued)

FOREIGN PATENT DOCUMENTS

EP 1575104 A 9/2005
EP 1577914 A 9/2005
(Continued)

*Primary Examiner* — Adam A Arciero
(74) *Attorney, Agent, or Firm* — Nixon Peabody LLP; Jeffrey L. Costellia (57) ABSTRACT

A mixture of amorphous PAHs and at least one of a carrier ion storage metal, a Sn compound, a carrier ion storage alloy, a metal compound, Si, Sb, and $SiO_2$ is used as the negative electrode active material. The theoretical capacity of amorphous PAHs greatly exceeds that of a graphite based carbon material. Thus, the use of amorphous PAHs enables the negative electrode active material to have a higher capacity than in the case of using the graphite-based carbon material. Further, addition of at least one of the carrier ion storage metal, the Sn compound, the carrier ion storage alloy, the metal compound, Si, Sb, and $SiO_2$ to the amorphous PAHs enables the negative electrode active material to have a higher capacity than the case of only using the amorphous PAHs.

11 Claims, 8 Drawing Sheets

20 μm

Related U.S. Application Data continuation of application No. 13/597,675, filed on Aug. 29, 2012, now abandoned.

(51) Int. Cl.

| | | |
|---|---|---|
| *H01G 11/50* | (2013.01) | |
| *H01G 11/30* | (2013.01) | |
| *H01M 4/48* | (2010.01) | |
| *H01M 4/13* | (2010.01) | |
| *H01M 4/66* | (2006.01) | |
| *H01G 11/32* | (2013.01) | |
| *H01G 11/52* | (2013.01) | |
| *H01G 11/62* | (2013.01) | |
| *H01M 4/04* | (2006.01) | |
| *H01M 4/131* | (2010.01) | |
| *H01M 4/137* | (2010.01) | |
| *H01M 4/1391* | (2010.01) | |
| *H01M 4/1399* | (2010.01) | |
| *H01M 4/36* | (2006.01) | |
| *H01M 4/60* | (2006.01) | |
| *H01M 10/0525* | (2010.01) | |
| *H01M 4/02* | (2006.01) | |

(52) U.S. Cl.
CPC ............ *H01G 11/52* (2013.01); *H01G 11/62* (2013.01); *H01M 4/0404* (2013.01); *H01M 4/0471* (2013.01); *H01M 4/13* (2013.01); *H01M 4/131* (2013.01); *H01M 4/137* (2013.01); *H01M 4/1391* (2013.01); *H01M 4/1399* (2013.01); *H01M 4/366* (2013.01); *H01M 4/386* (2013.01); *H01M 4/387* (2013.01); *H01M 4/483* (2013.01); *H01M 4/606* (2013.01); *H01M 4/662* (2013.01); *H01M 10/0525* (2013.01); *H01M 2004/027* (2013.01); *H01M 2220/30* (2013.01); *Y02E 60/13* (2013.01); *Y02T 10/70* (2013.01)

(58) Field of Classification Search
CPC ....... H01M 10/0525; H01M 2004/027; H01M 2220/30; H01M 4/0404; H01M 4/0471; H01M 4/13; H01M 4/131; H01M 4/137; H01M 4/1391; H01M 4/1399; H01M 4/366; H01M 4/386; H01M 4/387; H01M 4/483; H01M 4/606; H01M 4/662; Y02E 60/10; Y02E 60/13; Y02T 10/70
See application file for complete search history.

(56) References Cited

U.S. PATENT DOCUMENTS

| | | | |
|---|---|---|---|
| 7,452,632 B2 | 11/2008 | Lee et al. | |
| 7,491,467 B2 | 2/2009 | Satoh et al. | |
| 7,674,555 B2 | 3/2010 | Nanba et al. | |
| 8,152,865 B2 | 4/2012 | Ando et al. | |
| 8,906,554 B2 | 12/2014 | Hwang et al. | |
| 2002/0164479 A1 | 11/2002 | Matsubara et al. | |
| 2004/0234859 A1* | 11/2004 | Lee .................. | H01M 4/38 429/231.95 |
| 2005/0064096 A1* | 3/2005 | Kurihara ............. | H01G 11/86 427/215 |
| 2006/0057433 A1 | 3/2006 | Ando et al. | |
| 2009/0104519 A1 | 4/2009 | Kim et al. | |
| 2009/0117473 A1 | 5/2009 | Satoh et al. | |
| 2009/0197168 A1 | 8/2009 | Nishida et al. | |
| 2010/0178571 A1 | 7/2010 | Nanba et al. | |
| 2011/0236752 A1 | 9/2011 | Kawakami et al. | |
| 2011/0308935 A1 | 12/2011 | Yamazaki et al. | |
| 2012/0094173 A1* | 4/2012 | Moruiguchi ....... | H01M 10/0525 429/188 |
| 2012/0295155 A1* | 11/2012 | Deng ................. | H01M 4/136 429/200 |
| 2013/0217567 A1 | 8/2013 | Kishimoto et al. | |
| 2013/0224581 A1 | 8/2013 | Saito et al. | |

FOREIGN PATENT DOCUMENTS

| | | | |
|---|---|---|---|
| EP | 2056379 A | 5/2009 | |
| JP | 09-293507 A | 11/1997 | |
| JP | 2001-102048 A | 4/2001 | |
| JP | 2004-119176 A | 4/2004 | |
| JP | 2004-182512 A | 7/2004 | |
| JP | 2004-214182 A | 7/2004 | |
| JP | 2004-349253 A | 12/2004 | |
| JP | 2007-220411 A | 8/2007 | |
| JP | 2009-026760 A | 2/2009 | |
| JP | 2009-105046 A | 5/2009 | |
| JP | 2010-170943 A | 8/2010 | |
| JP | 2011-081960 A | 4/2011 | |
| JP | 2013-065554 A | 4/2013 | |
| WO | WO-2004/059672 | 7/2004 | |
| WO | WO-2010/150859 | 12/2010 | |
| WO | WO-2012/063681 | 5/2012 | |
| WO | WO-2012063681 A1 * | 5/2012 | .......... H01M 4/9041 |

* cited by examiner

NEGATIVE ELECTRODE OF POWER STORAGE DEVICE AND POWER STORAGE DEVICE

BACKGROUND OF THE INVENTION

1. Field of the Invention

The present invention relates to a negative electrode of a power storage device and a power storage device having the negative electrode.

2. Description of the Related Art

With an increasing concern for the environmental issues, power storage devices such as secondary batteries and electric double layer capacitors used for power supply for hybrid vehicles and the like have been actively developed. As the power storage devices, lithium (Li)-ion secondary batteries and Li-ion capacitors which have high energy performance have attracted attention. The Li-ion secondary battery, which is compact but can have a large capacity, has already been mounted on a portable information terminal such as a mobile phone or a laptop personal computer, thereby contributing to miniaturization of products.

The power storage device basically has a structure in which an electrolyte is provided between a positive electrode and a negative electrode. It is known that each of the positive electrode and the negative electrode includes a current collector and an active material provided over the current collector. For example, in a Li-ion secondary battery, a material capable of storing and releasing Li ions is used as an active material.

Various approaches have been taken to improve the characteristics of a power storage device. For example, study of a negative electrode active material for a power storage device is one of the approaches to improve the characteristics of a power storage device. A graphite-based carbon material, which is mainly used as the negative electrode active material, has the theoretical capacity of 372 mAh/g and has already been put to practical use with a capacity close to the theoretical capacity. Thus, an active material with a higher capacity (charge capacity) is required.

A material containing a semimetal, a semimetal compound, a metal, or a metal compound is given as an example of a material having a higher capacity than a graphite-based carbon material when it is used as a negative electrode active material for a power storage device. For example, silicon (Si) is known to have a higher capacity than a graphite-bused carbon material. Patent Document 1 discloses a negative electrode of a Li-ion secondary battery in which a fiber shaped carbon material, silicon, and a silicon compound are used in addition to a graphite-based carbon material. Patent Document 2 discloses a Li-ion secondary battery in which a graphite-based carbon material and a metal-carbon composite material are used.

However, a negative electrode active material with a higher capacity is required to meet an increasing demand for a compact power storage device.

REFERENCE

Patent Documents

[Patent Document 1] Japanese Published Patent Application No. 2004-182512

[Patent Document 2] Japanese Published Patent Application No. 2009-105046

SUMMARY OF THE INVENTION

An object of one embodiment of the invention is to provide a negative electrode active material with a higher capacity.

In order to achieve the object, in one embodiment of the invention, a mixture of amorphous polycyclic aromatic hydrocarbons (PAHs) and at least one of a carrier ion storage metal, a carrier ion storage alloy, a metal compound, Si, Sb, and $SiO_2$ is used as a negative electrode active material. Note that in this specification, "carrier ion storage metal" means a metal which can store and release carrier ions in a power storage device. Further, "carrier ion storage alloy" means an alloy which can store and release carrier ions in a power storage device.

The theoretical capacity of amorphous PAHs is 1116 mAh/g and an experimental capacity thereof is 680 mAh/g, both of which greatly exceed 372 mAh/g that is the theoretical capacity of a graphite-based carbon material. Therefore, in the case where amorphous PAHs are used, a negative electrode active material can have a higher capacity than in the case where a graphite-based carbon material is used.

Further, when amorphous PAHs that are materials with a high capacity and at least one of a carrier ion storage metal, a carrier ion storage alloy, a metal compound, Si, Sb, and $SiO_2$ are mixed, the capacity of the negative electrode active electrode can be higher than in the case where only the amorphous PAHs are used.

One embodiment of the invention is a negative electrode of a power storage device comprising a negative electrode active material containing amorphous PAHs and at least one of a carrier ion storage metal, a carrier ion storage alloy, a metal compound, Si, Sb, and $SiO_2$; and a current collector.

The carrier ion storage metal may be any one of Sn, Al, Zn, and Bi. The carrier ion storage alloy may be any one of alloys expressed by a Sn-M alloy (M is Fe, Co, Mn, V, or Ti). Further, as the metal compound, a Sn compound or a metal compound used as a positive electrode material in a state where carrier ions are released (a decarrierionized state) can be used. The Sn compound may be any one of $SnO_2$, $Sn_2P_2O_7$, and $SnPBO_6$. Further, the metal compound used as the positive electrode material in a state where carrier ions are released (a decarrierionized state) may be any one of $SnPO_4ClCoO$, $NiO$, $MnO_2$, and $FePO_4$.

In the above, the carrier ion may be either of a Li ion and a Na ion.

Further, the amorphous PAHs may have a spherical shape.

Furthermore, at least one of a metal, a metal compound, Si, Sb, and $SiO_2$ may be attached to the surfaces of the amorphous PAHs.

Furthermore, the amorphous PAHs may contain at least one of a metal, a metal compound, Si, Sb, and $SiO_2$ at greater than or equal to at 1 wt % and less than or equal to 50 wt %.

Furthermore, one embodiment of the invention is a power storage device including the negative electrode, a positive electrode, and an electrolyte solution containing an electrolyte.

According to one embodiment of the invention, a negative electrode active material with a higher capacity can be provided.

DETAILED DESCRIPTION OF THE INVENTION

Hereinafter, Embodiments are described in detail using the drawings. Note that the invention is not limited to the following description of the embodiments, and it is readily appreciated by those skilled in the art that modes and details of the invention can be modified in a variety of ways without departing from the spirit of the invention disclosed in this specification and the like. A structure of the different embodiment can be implemented by combination appropriately. On the description of the invention with reference to the drawings, a reference numeral indicating the same part is used in common throughout different drawings, and the repeated description is omitted.

Note that the position, the size, the range, or the like of each structure illustrated in the drawings and the like is not accurately represented in some cases for easy understanding. Therefore, the present invention is not necessarily limited to the position, size, range, or the like disclosed in the drawings and the like.

Embodiment 1

Figure 1A:
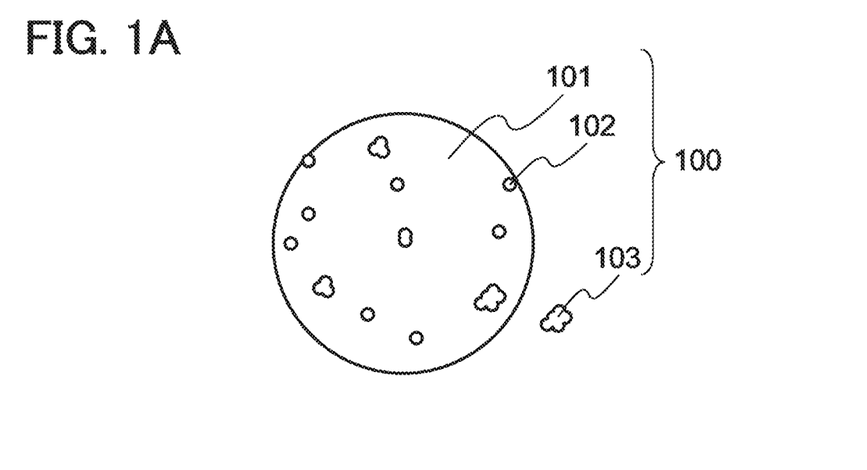
FIGS. 1A to 1C are schematic views of examples of a negative electrode active material and a negative electrode.

In this embodiment, a negative electrode active material for a power storage device, which is one embodiment of the invention, and a manufacturing method thereof will be described with reference to FIGS. 1A to 1C.

Negative Electrode Active Material

An example of a negative electrode active material 100 will be described with reference FIG. 1A. The negative electrode active material 100 includes amorphous PAHs 101 and a fine particle 102 formed of any one of a metal, a metal compound, Si, Sb, and $SiO_2$. In addition, the negative electrode active material 100 may include a secondary particle 103 in which a plurality of the fine particles 102 is aggregated.

As the amorphous PAHs 101, PAHs with a hydrogen/carbon atomic ratio (hereinafter referred to as a H/C; ratio) of 0.05 or more and 0.5 or less are used. As the amorphous PAHs with a H/C ratio of 0.05 or more and 0.5 or less, for example, a polyacenic material or a hard carbon-based material can be used.

The polyacenic material has a higher capacity (about 850 mAh/g) than the graphite-based carbon material. Further, the hard carbon-based material has a higher capacity (about 400 mAh/g to 700 mAh/g) than the graphite-based carbon material and has discharge characteristics such that voltage uniformly descends to a discharge end voltage. Thus, any of these materials is preferably used for the negative electrode active material because in that case a power storage device has a high energy density.

When the amorphous PAHs 101 have a Spherical shape, variation in the contact area with other constituent elements of the negative electrode can be reduced. Thus, the amorphous PAHs preferably have a spherical shape because variation in resistance in the negative electrode active layer can be reduced; further, because there is little abrasion when it is transferred, high-density filling is easily achieved, and fluidity in the case of being mixed with other constituent elements of the negative electrode can be improved. Specifically, a grain diameter of the amorphous PAHs 101 is preferably 100 μm or less.

Note that in this specification and the like, "spherical shape" does not necessarily mean an accurate spherical shape. For example, a substantially spherical shape (for example, the smallest diameter is greater than or equal to 70% and less than 100% of the longest diameter), a deformed spherical shape, a spherical shape with a projection on its surface, and an elliptical spherical shape are included.

In this embodiment, for the amorphous PAHs 101, a spherical polyacenic material is used.

In this embodiment, a metal, a metal compound, Si, Sb, or $SiO_2$ is mixed to the amorphous PAHs 101.

A carrier ion storage metal is used as the metal to be mixed. Alternatively, a carrier ion storage alloy or a metal compound is used as the metal compound to be mixed.

As carrier ions, alkali metal ions such as Li ions or sodium (Na) ions, alkaline earth metal ions, beryllium (Be) ions, magnesium (Mg) ions, or the like can be used. The use of Li ions as the carrier ions enables a power storage device to have a small memory effect, a high energy density, a high charge/discharge capacity, and a high output voltage, which is preferable. Further, Na ions that are abundant in resources are preferably used because the cost of manufacturing a power storage device can be reduced. In this embodiment, Li ions are used as the carrier ions.

As the carrier ion storage metal to be mixed, a metal having properties of storing carrier ions, for example, Sn, Al, Zn, or Bi can be used.

As the carrier ion storage alloy to he mixed, an alloy having properties of storing carrier ions, for example, an alloy represented by Sn-M (M is Fe, Co, Mn, V, or Ti) can be used.

As the metal compound to be mixed, a Sn compound or a metal compound used as a positive electrode material in a state where carrier ions are released (a decarrierionized state) can be used. As the Sn compound, for example, $SnO_2$, $Sn_2P_2O_7$, $SnPBO_6$, or $SnPO_4Cl$ can be used. Further, as the metal compound used as a positive electrode material in a state where carrier ions arc released (a decarrierionized state), a stable substance even in the absence of carrier ions, among substances that can be used as a positive electrode active material, for example, CoO, NiO, $MnO_2$, $NiMnO_4$, or $FePO_4$ can be used.

The fine particle 102 is a particle composed of a metal, a metal compound, Si, Sb, or $SiO_2$. The fine particle 102 preferably has a grain diameter of, for example, 1 μm or less in order to increase the efficiency of reaction with the carrier ion.

The fine particle 102 composed of a metal, a metal compound, Si, Sb, or $SiO_2$ may be, but is not necessarily, attached to the outer surface of the amorphous PAHs 101. Further, the secondary particle 103 may be generated from the particle 102 composed of a metal, a metal compound, Si, Sb, or $SiO_2$. The secondary particle 103 may be, but is not necessarily, attached to the outer surface of the amorphous PAHs 101. Note that it is more preferable that the fine particle 102 composed of a metal, a metal compound, Si, Sb, or $SiO_2$ be attached to the PAHs 101 without being aggregated. This is because the fine particle 102 has a larger specific surface area than the aggregated secondary particles 103 and easily reacts with carrier ions. When the fine particle 102 is attached to the amorphous PAHs 101, the secondary particle is not easily formed.

It is preferable that the amorphous PAHs 101 contain any one of a metal, a metal compound, Si, Sb, and $SiO_2$ at greater than or equal to 1 wt % and less than or equal to 50 wt %, preferably greater than or equal to 1 wt % and less than or equal to 30 wt %. It is not preferable that the amount of a metal, a metal compound, Si, Sb, or $SiO_2$ be too small, because the effect of making the power storage device having a high capacity is decreased. Also, it is not preferable that the amount of a metal, a metal compound, Si, Sb, or $SiO_2$ be too large, because electric conductivity of the negative electrode active material is too low. In this embodiment, the amorphous PAHs 101 contain $SiO_2$ at greater than or equal to 1 wt % and less than or equal to 30 wt %.

Negative Electrode

An example of a negative electrode 200 of a power storage device that is one embodiment of the present invention will be described with reference to FIGS. 1B and 1C.

Figure 1B:
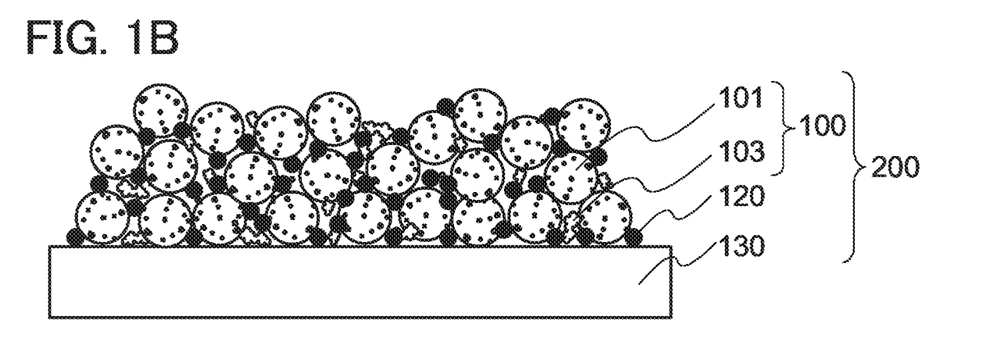

The negative electrode 200 in FIG. 1B includes the negative electrode active material 100, a conduction auxiliary agent 120, and a binder (not shown in FIG. 1B) over a negative electrode current collector 130.

A conductive material such as copper (Cu), titanium (Ti), aluminum (Al), or stainless steel, which is processed into a foil shape, a plate shape, a net shape, or the like can be used for the negative electrode current collector 130.

An electron-conductive material which does not cause chemical change in the power storage device is used for the conduction auxiliary agent 120. For example, graphite; a carbon particle; a carbon fiber; a metal material such as Cu, nickel (Ni), Al, or silver (Ag); or powder, fiver, and the like of mixtures thereof can be used. In the negative electrode 200 in FIG. 1B, acetylene black that is one of carbon particles is used.

The binder exists between the negative electrode active material 100, the conduction auxiliary agent 120, and the current collector 130, and these substances are bonded one another by the binder. As the binder, polysaccharides such as starch, carboxymethyl cellulose, hydroxypropyl cellulose, regenerated cellulose, and diacetyl cellulose; vinyl polymers such as polyvinyl chloride, polyethylene, polypropylene, polyvinyl alcohol, polyvinyl pyrrolidone, polytetrafluoroethylene, polyvinylidene fluoride, ethylene-propylene-diene monomer (EPDM) rubber, sulfonated EPDM rubber, styrene-butadiene rubber, butadiene rubber, and fluorine rubber; polyether such as polyethylene oxide; and the like can be given. In this embodiment, PVdF is used.

Note that the negative electrode active material layer may be predoped with carrier ions. When Li ions are used as the carrier ions, a Li layer is formed on a surface of the negative electrode active material layer by a sputtering method. Alternatively, Li foil is provided on the surface of the negative electrode active material layer, whereby the negative electrode active material layer can be predoped with Li.

Figure 1C:
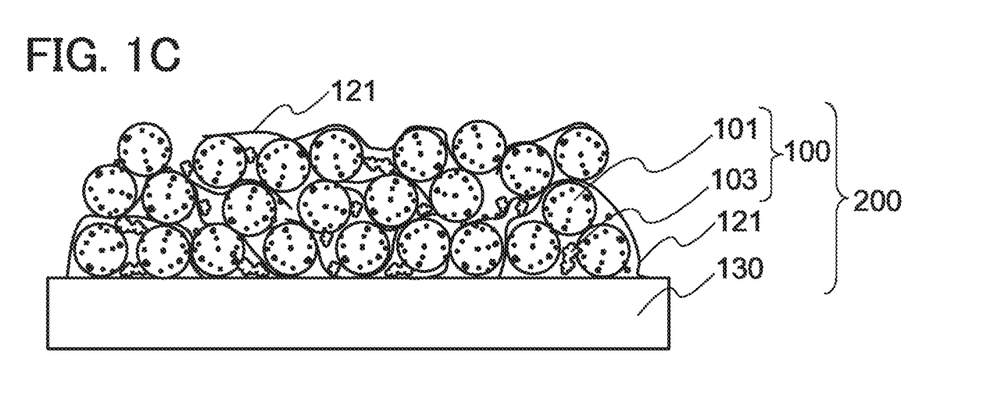

Further, as shown in FIG. 1C, graphene or multilayer graphene 121 may be used instead of the conduction auxiliary agent 120 and the binder. The use of graphene or multilayer graphene 121 can suppress adverse effects (pulverization of the negative electrode active material 100 and separation of the negative electrode active material layer) of expansion and contraction of the negative electrode active material 100 due to storing and releasing of carrier ions. Further, graphene or the multilayer graphene 121 stores carrier ions and functions as a negative electrode active material and thus a negative electrode with a higher capacity can be obtained.

Method for Manufacturing Negative Electrode Active Material

An example of a method for manufacturing a negative electrode active material will be described below.

First, materials of amorphous PAHs are prepared. When a polyacenic material is used as the amorphous PAHs 101, for example, a phenol resin can be used for raw materials of the polyacenic material. When the polyacenic material is used, a baking temperature at the time of baking that is to be described later can be low; thus, productivity is improved.

When a hard carbon-based material is used as the amorphous PAHs 101, for example, a furfuryl alcohol resin, a saccharide such as saccharose or cellulose can be used for raw materials of the hard carbon-based material.

Note that cleaning is preferably performed to remove an organic impurity attached to the amorphous PAHs 101. For example, ultrasonic cleaning in an organic solvent maybe conducted.

Next, a metal, a metal compound, Si, Sb, or $SiO_2$ is mixed to the amorphous PAHs 101. As for a metal, a metal compound, Si, Sb, or $SiO_2$, the description of FIG. 1A can be referred to.

In this embodiment, a polyacenic material is used as the amorphous PAHs 101, and a spherical phenol resin is used for the raw materials of the polyacenic material. A fine particle of $SiO_2$ is mixed to the spherical phenol resin.

There is no limitation on a method for mixing, and for example, a dry-mixing method can be performed. In the case where a spherical phenol resin is used, a method in which the shape of the resin can be maintained is preferably employed; for example, mixing with the use of a rotatable roller is preferably employed.

Next, a mixture of the material of the amorphous PAHs 101 and at least one of a metal, a metal compound, Si, Sb, and $SiO_2$ is baked. The baking is preferably performed under an inert atmosphere, for example, a nitrogen atmosphere. The temperature and time at the baking may be set under sufficient conditions for carbonization of the amorphous PAHs 101. In the case of using a phenol resin, for example, the baking temperature can be set to greater than or equal to 600° C. and less than or equal to 800° C. There is no limitation on the method of baking; for example, baking using a muffle furnace can be performed.

By the above method, the negative electrode active material 100 that is one embodiment of the invention can be manufactured.

Method for Manufacturing Negative Electrode

An example of a method for manufacturing the negative electrode 200 including the negative electrode active material 100 will be described below.

First, the negative electrode active material 100, the conduction auxiliary agent 120, and the binder are mixed using a solvent, so that slurry is formed. There is no particular limitation on the solvent, for example, an Organic solvent such as N-methyl-2-pyrrolidone (NMP) can be used.

Note that graphene or the multilayer graphene 121 may be used instead of the conduction auxiliary agent 120 and the binder. Note that in this specification, graphene refers to a one-atom-thick sheet of carbon molecules having $sp^2$ bonds. Further, multilayer graphene refers to a stack of 2 to 100 sheets of graphene, and may contain less than or equal to 30 at. % of an element other than carbon, such as oxygen or hydrogen. Alternatively, the multilayer graphene may contain less than or equal to 15 at. % of an element other than carbon and hydrogen. Note that an alkali metal such as Li, Na, or potassium (K) may be added to graphene or multilayer graphene.

Next, the slurry is applied onto the negative electrode current collector 130. An anchor coat may be applied before the slurry is applied to the negative electrode current collector 130 so as to improve adhesion between the negative electrode current collector 130 and the negative electrode active material 100. Further, the slurry containing the negative electrode active material 100 may be applied to one surface of the negative electrode current collector 130 as shown in FIGS. 1B and 1C or both surfaces thereof.

Next, after the negative electrode current collector 130 and the slurry are dried to form the negative electrode 200 into a desired shape, the negative electrode 200 is further dried.

Through the above steps, the negative electrode 200 that is one embodiment of the invention can be manufactured.

Embodiment 2

In this embodiment, an example of a power storage device that is one embodiment of the present invention will be described with reference to FIGS. 2A and 2B.

The power storage device that is one embodiment of the present invention includes at least a positive electrode, a negative electrode, a separator, and an electrolyte solution. The negative electrode is the one described in Embodiment 1.

The electrolyte is a nonaqueous solution containing all electrolyte salt or a solution containing an electrolyte salt. Any electrolyte salt can be used as the electrolyte salt as long as it contains carrier ions such as alkali metal ions, alkaline earth metal ions, Be ions, or Mg ions. Examples of the alkali metal ions include Li ions, Na ions, and K ions. Examples of the alkaline earth metal ions include calcium (Ca) ions, strontium (Sr) ions, and barium (Ba) ions. In this embodiment, the electrolyte salt is an electrolyte salt containing Li ions (hereinafter, referred to as a Li-containing electrolyte salt).

With the above structure, the power storage device can be a secondary battery or a capacitor. Further, an electric double layer capacitor can be obtained by using only a solvent for an electrolyte solution without using the electrolyte salt.

Here, the power storage device will be described with reference to the drawing.

Figure 2A:
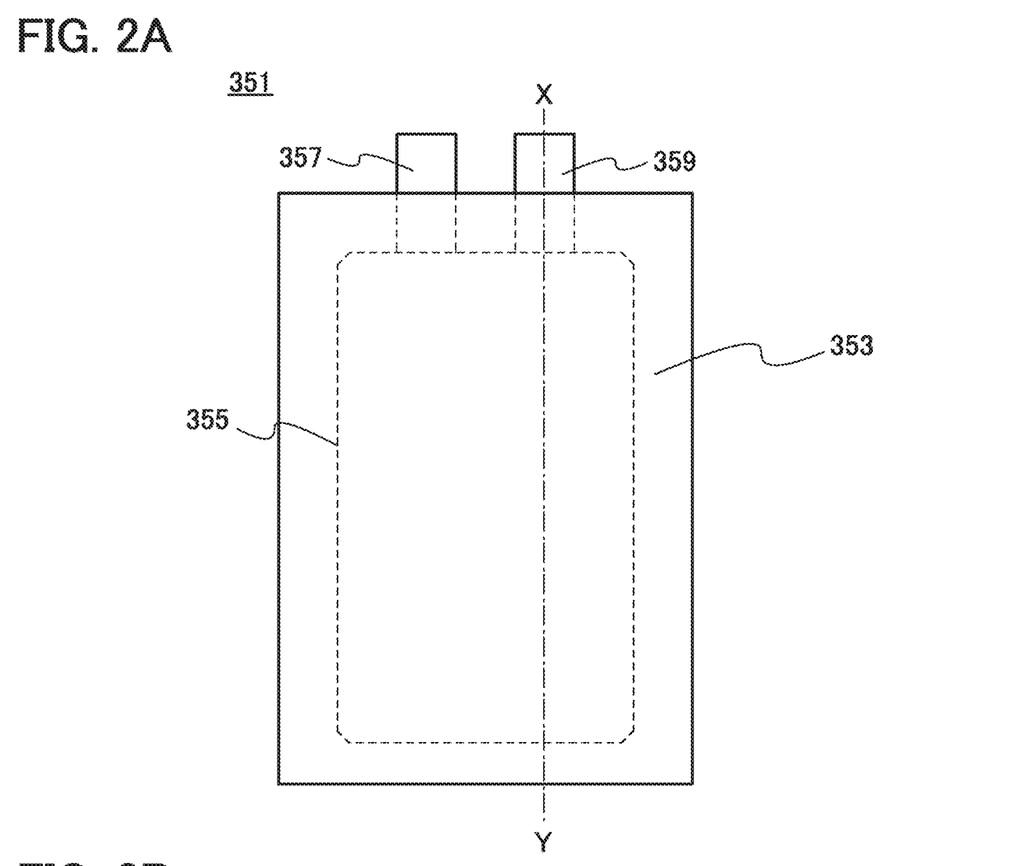
FIGS. 2A and 2B are a plan view and a cross-sectional view illustrating one embodiment of a power storage device.

FIG. 2A shows a structural example of a power storage device 351. FIG. 2B is a cross-sectional view along dashed dotted line X-Y in FIG. 2A.

The power storage device 351 shown in FIG. 2A includes a power storage cell 355 in an exterior member 353. The power storage device 351 further includes terminal portions 357 and 359 which are connected to the power storage cell 355. For the exterior member 353, a laminate film, a polymer film, a metal film, a metal case, a plastic case, or the like can be used.

Figure 2B:
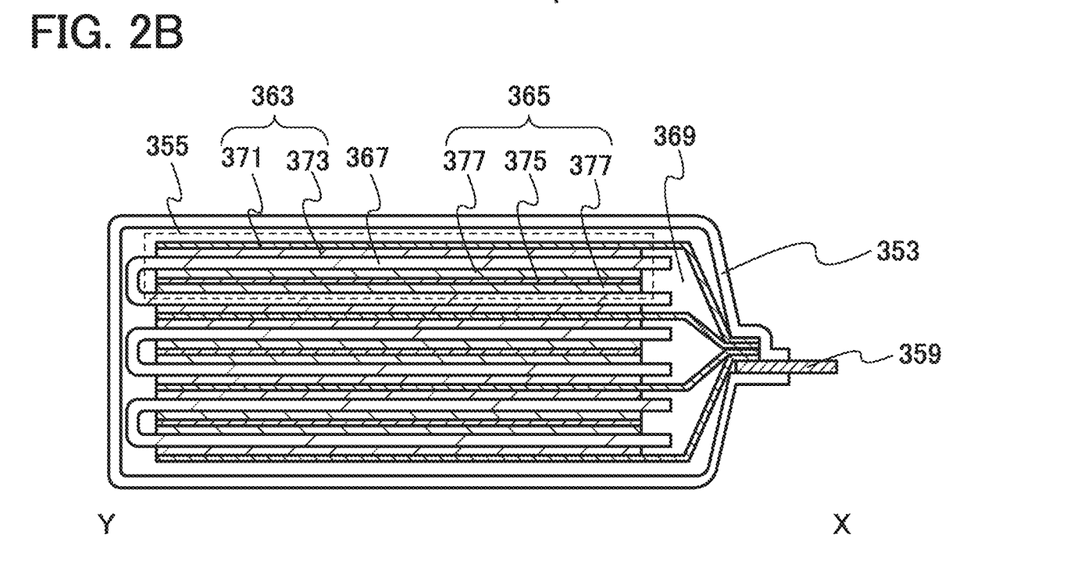

As shown in FIG. 2B, the power storage cell 355 includes a negative electrode 363, a positive electrode 365, a separator 367 between the negative electrode 363 and the positive electrode 365, and an electrolyte 369 with which the exterior member 353 is filled.

The negative electrode 363 is the one described in Embodiment 1. The negative electrode current collector 371 is connected to the terminal portion 359. A positive electrode current collector 375 is connected to the terminal portion 357.

Further, the terminal portions 357 and 359 each partly extend outside the exterior member 353.

The positive electrode layer 365 is formed to include a positive electrode current collector 375 and a positive electrode active material layer 377. The positive electrode active material layer 377 is formed on one or both surfaces of the positive electrode current collector 375. Further, the positive electrode 365 may include a binder, a conduction auxiliary agent, and the like besides the positive electrode current collector 375 and the positive electrode active material layer 377.

Although a sealed thin power storage device is described as the power storage device 351 in this embodiment, the external shape of the power storage device 351 is not limited thereto. A power storage device having any of a variety of shapes, such as a button power storage device, a cylindrical power storage device, or a rectangular power storage device can be used as the power storage device 351. Further, although the structure where the positive electrode, the negative electrode, and the separator are stacked is described in this embodiment, a structure where the positive electrode, the negative electrode, and the separator are rolled may be employed.

For the positive electrode current collector 375, a conductive material such as Al or stainless steel which is processed into a foil shape, a plate shape, a net shape, or the like can be used. Alternatively, a conductive layer provided by deposition separately on a substrate and then separated from the substrate can be used as the positive electrode current collector 375.

The positive electrode active material layer 377 can be formed using $LiFeO_2$, $LiCoO_2$, $LiNiO_2$, $LiMnO_4$, $LiFePO_4$, $LiCoPO_4$, $LiNiPO_4$, $LiMn_2PO_4$, $V_2O_5$, $MnO_2$, or another Li compound as a material. Note that when carrier ions are alkali metal ions other than Li ions, alkaline earth metal ions, Be ions, or Mg ions, the positive electrode active material layer 377 can be formed using, instead of Li in the above Li compounds, an alkali metal (e.g., Na or K), an alkaline earth metal (e.g., Ca, Sr, or Ba), Be, or Mg. For example, when carrier ions are Na ions, $NaNi_{0.5}Mn_{0.5}O_2$ can be used.

The positive electrode active material layer 377 is formed over the positive electrode current collector 375 by a coating method or a physical vapor deposition method (e.g., a sputtering method), whereby the positive electrode 365 can be formed. In the case where a coating method is employed, the positive electrode 365 is formed in such a manner that a paste in which a conduction auxiliary agent (e.g. acetylene black), a binder (e.g., PVDF), or the like is mixed with any of the above materials for the positive electrode active material layer 377 is applied to the positive electrode current collector 375 and dried. In this case, the positive electrode 365 is preferably molded by applying pressure as needed.

The positive electrode active material layer 377 may be formed using a paste of a mixture of the positive electrode active material and graphene or multilayer graphene instead of a conductive auxiliary agent and a binder.

The use of graphene or multilayer graphene instead of a conductive auxiliary agent and a binder leads to a reduction in amount of the conductive auxiliary agent and the binder in the positive electrode 365. In other words, the weight of the positive electrode 365 can be reduced; accordingly, the charge/discharge capacity of the power storage device per unit weight of the negative electrode can be increased.

Note that strictly speaking, "positive electrode active material" or "negative electrode active material" refers only to a material that relates to storing and releasing of ions functioning as carriers. In this specification, however, in the case of using a coating method to form an active material layer, for the sake of convenience, the active material layer collectively refers to the materials of the active material layer, that is, a substance that is actually an "active material", a conductive auxiliary agent, a binder, and the like.

The electrolyte 369 is a nonaqueous solution containing an electrolyte salt or a solution containing an electrolyte salt. In particular, in a Li-ion secondary battery, a Li-containing electrolyte salt in which Li ions as carrier ions can transfer and stably exist is used. Examples of the Li-containing electrolyte salt includes $LiClO_4$, $LiAsF_6$, $LiBF_4$, $LiPF_6$, and $Li(C_2F_5SO_2)_2N$. Note that when carrier ions are alkali metal ions other than Li ions or alkaline earth metal ions, alkali metal salt (e.g., Na salt or K salt), alkaline earth metal salt (e.g., Ca salt, Sr salt or Ba salt), Be salt, Mg salt, or the like can be used for the solute of the electrolyte 369. For example, when Na ions are used as the carrier ions, $NaPF_6$, $NaClO_4$, or the like can be used as the solute (electrolyte salt).

The electrolyte 369 is preferably a nonaqueous solution containing an electrolyte salt. That is, as a solvent of the electrolyte 369, an aprotic organic solvent is preferably used. Examples of the aprotic organic solvent include ethylene carbonate, propylene carbonate, dimethyl carbonate, diethyl carbonate, γ-butyrolactone, acetonitrile, dimethoxyethane, and tetrahydrofuran, and one or more of these materials can be used. Alternatively, as the aprotic organic solvent, one ionic liquid or a plurality of ionic liquids may be used. Owing to non-flammability and non-volatility of an ionic liquid, it is possible to suppress explosion, inflammation, and the like of the power storage device 351 at the time when the internal temperature of the power storage device 351 rises, resulting in improvement in safety.

When a gelled high-molecular material containing an electrolyte salt is used as the electrolyte 369, safety against liquid leakage and the like is improved and the power storage device 351 can be thinner and more lightweight. Examples of the gelled high-molecular material include a silicon gel, an acrylic gel, an acrylonitrile gel, polyethylene oxide, polypropylene oxide, and a fluorine-based polymer.

As the electrolyte 369, a solid electrolyte such as $Li_3PO_4$ can be used.

As the separator 367, an insulating porous material is used. For example, paper; nonwoven fabric; a glass fiber; a synthetic fiber containing nylon (polyamide), vinylon (polyvinyl alcohol based fiber), polyester, acrylic, polyolefin, or polyurethane; or ceramics may be used. Note that a material which does not dissolve in the electrolyte 369 should be selected.

In the case where the power storage device that is one embodiment of the present invention is a Li-ion capacitor, instead of the positive electrode active material layer 377, a material capable of reversibly storing and releasing one of or both Li ions and anions may be used. Examples of the material include active carbon, graphite, a conductive polymer, and a polyacenic material.

With the use of the negative electrode active material, a power storage device with a high capacity can be obtained.

Note that this embodiment can be implemented in appropriate combination with any of the structures of the other embodiments and example.

Embodiment 3

The power storage device that is one embodiment of the present invention can be used for power supplies of a variety of electric and electronic devices which are operated with power.

Specific examples of electric and electronic devices each utilizing the power storage device that is one embodiment of the present invention are as follows: display devices, lighting devices, desktop personal computers and laptop personal computers, image reproduction devices which reproduce still images and moving images stored in recording media such as digital versatile discs (DVDs), mobile phones, portable game machines, portable information terminals, tablet terminals, e-book readers, video cameras, digital still cameras, high-frequency heating appliances such as microwave ovens, electric rice cookers, electric washing machines, air-conditioning systems such as air conditioners, electric refrigerators, electric freezers, electric refrigerator-freezers, freezers for preserving DNA, and medical electrical and electronic equipment such as dialyzers. In addition, moving objects driven by an electric motor using electric power from a power storage device are also included in the category of electric and electronic devices. As examples of the moving objects, electric vehicles, hybrid vehicles which include both an internal-combustion engine and a motor, motorized bicycles including motor-assisted bicycles, and the like can be given.

In the electric and electronic devices, the power storage device that is one embodiment of the present invention can be used as a power storage device for supplying enough electric power for almost the whole power consumption (such a power storage device is referred to as a main power supply). Alternatively, in the electric and electronic devices, the power storage device that is one embodiment of the present invention can be used as a power storage device which can supply electric power to the electric and electronic devices when the supply of power from the main power supply or a commercial power supply is stopped (such a power storage device is referred to as an uninterruptible power supply). Further alternatively, in the electric and electronic device, the power storage device that is one embodiment of the present invention can be used as a power storage device for supplying electric power to the electric and electronic devices at the same time as the electric power supply from the main power supply or a commercial power supply (such a power storage device is referred to as an auxiliary power supply).

Figure 3:
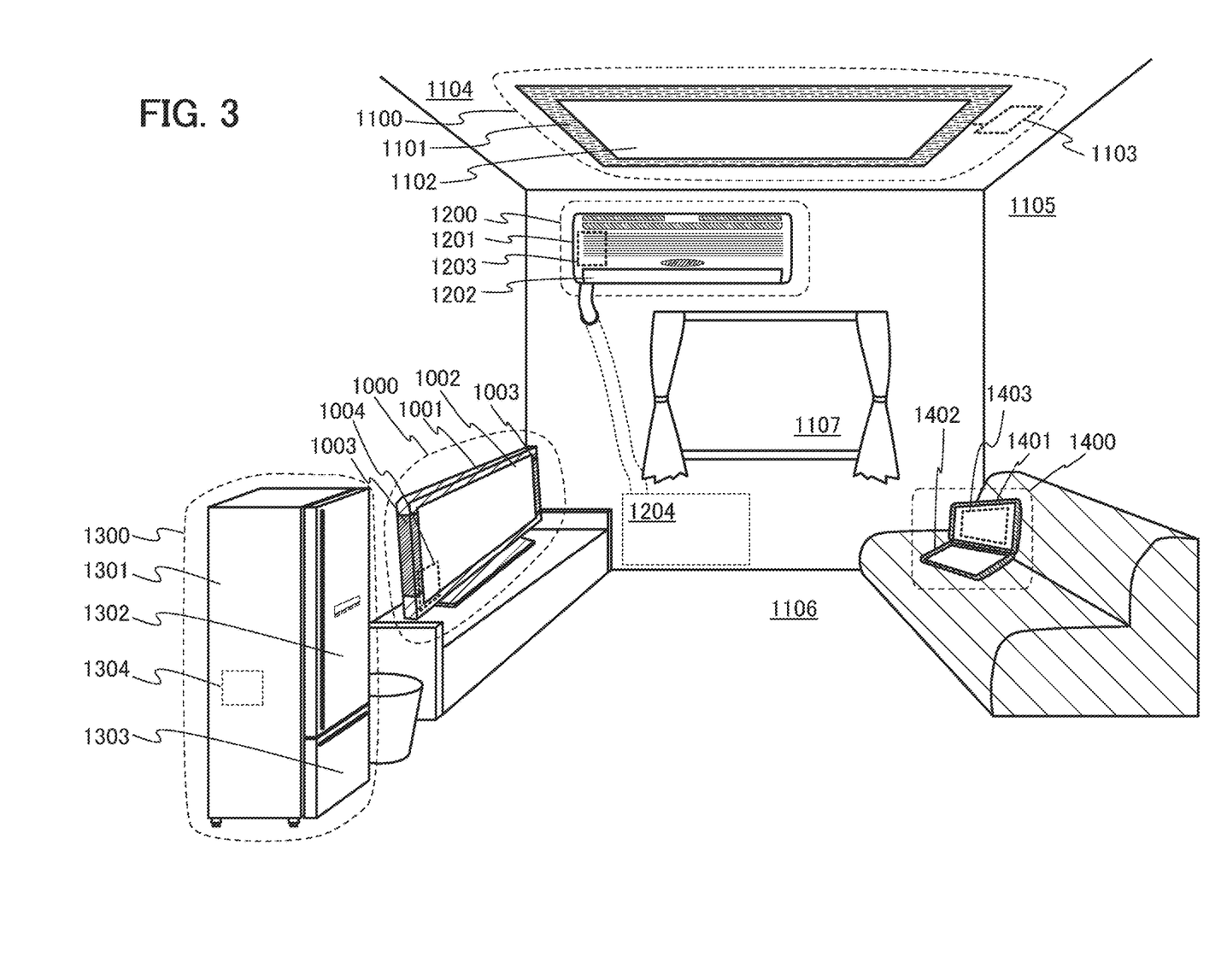
FIG. 3 is a diagram illustrating application modes of a power storage device.

FIG. 3 illustrates specific structures of the electric and electronic devices. In FIG. 3, a display device 1000 is an example of an electronic device including a power storage device 1004 that is one embodiment of the present invention. Specifically, the display device 1000 corresponds to a display device for TV broadcast reception and includes a housing 1001, a display portion 1002, speaker portions 1003, the power storage device 1004, and the like. The power storage device 1004 that is one embodiment of the present invention is provided in the housing 1001. The display device 1000 can receive electric power from a commercial power supply. Alternatively, the display device 1000 can use electric power stored in the power storage device 1004. Thus, the display device 1000 can be operated with use of the power storage device 1004 that is one embodiment of the present invention as an uninterruptible power supply even when electric power cannot be supplied from the commercial power supply due to power failure or the like.

A semiconductor display device such as a liquid crystal display device, a light-emitting device provided with a light-emitting element such as an organic EL element in each pixel, an electrophoresis display device, a digital micromirror device (DMD), a plasma display panel (PDP), a field emission display (FED), and the like can be used for the display portion 1002.

Note that the display device includes, in its category, all of information display devices for personal computers, advertisement displays, and the like other than TV broadcast reception.

In FIG. 3, an installation lighting device 1100 is an example of an electric device including a power storage device 1103 that is one embodiment of the present invention. Specifically, the lighting device 1100 includes a housing 1101, a light source 1102, a power storage device 1103, and the like. FIG. 3 illustrates the case where the power storage device 1103 is provided in a ceiling 1104 on which the housing 1101 and the light source 1102 are installed; alternatively, the power storage device 1103 may be provided in the housing 1101. The lighting device 1100 can receive electric power from a commercial power supply. Alternatively, the lighting device 1100 can use electric power stored in the power storage device 1103. Thus, the lighting device 1103 can be operated with the use of the power storage device 1103 that is one embodiment of the present invention as an uninterruptible power supply even when electric power cannot be supplied from the commercial power supply due to power failure or the like.

Note that although the installation lighting device 1100 provided in the ceiling 1104 is illustrated in FIG. 3 as an example, the power storage device that is one embodiment of the present invention can be used in an installation lighting device provided in, for example, a wall 1105, a floor 1106, a window 1107, or the like other than the ceiling 1104. Alternatively, the power storage device can be used in a tabletop lighting device and the like.

As the light source 1102, an artificial light source which emits light artificially by using power can be used. Specifically, discharge lamps such as an incandescent lamp and a fluorescent lamp, and a light-emitting element such as an LED and an organic EL element are given as examples of the artificial light source.

In FIG. 3, an air conditioner including an indoor unit 1200 and an outdoor unit 1204 is an example of an electric device including a power storage device 1203 that is one embodiment of the present invention. Specifically, the indoor unit 1200 includes a housing 1201, a ventilation duct 1202, the power storage device 1203, and the like. FIG. 3 illustrates the case where the power storage device 1203 is provided in the indoor unit 1200; alternatively, the power storage device 1203 may be provided in the outdoor unit 1204. Further alternatively, the power storage devices 1203 may be provided in both the indoor unit 1200 and the outdoor unit 1204. The air conditioner can receive power from the commercial power supply. Alternatively, the air conditioner can use power stored in the power storage device 1203. Particularly in the case where the power storage devices 1203 are provided in both the indoor unit 1200 and the outdoor unit 1204, the air conditioner can be operated with the use of the power storage device 1203 that is one embodiment of the present invention as an uninterruptible power supply even when power cannot be supplied from a commercial power supply due to power failure or the like.

Note that although the separated air conditioner including the indoor unit and the outdoor unit is illustrated in FIG. 3 as an example, the power storage device that is one embodiment of the present invention can be used in an air conditioner in which the functions of an indoor unit and an outdoor unit are integrated in one housing.

In FIG. 3, an electric refrigerator-freezer 1300 is an example of an electric device including a power storage device 1304 that is one embodiment of the present invention. Specifically, the electric refrigerator-freezer 1300 includes a housing 1301, a door for a refrigerator 1302, a door for a freezer 1303, and the power storage device 1304. The power storage device 1304 is provided in the housing 1301 in FIG. 3. The electric, refrigerator-freezer 1300 can receive power from a commercial power supply. Alternatively, the electric refrigerator-freezer 1300 can use power stored in the power storage device 1304. Thus, the electric refrigerator-freezer 1300 can be operated with the use of the power storage device 1304 that is one embodiment of the present invention as an uninterruptible power supply even When power cannot be supplied from a commercial power supply due to power failure or the like.

Note that among the electric devices described above, a high-frequency heating apparatus such as a microwave and an electric device such as an electric rice cooker require high electric power in a short time. The tripping of a breaker of a commercial power supply in use of electric devices can be prevented by using the power storage device that is one embodiment of the present invention as an auxiliary power supply for supplying electric power which cannot be supplied enough by a commercial power supply.

In addition, in a time period when electric and electronic devices are not used, particularly when the proportion of the amount of power which is actually used to the total amount of power which can be supplied from a commercial power supply source (such a proportion referred to as a usage rate of power) is low, power can be stored in the power storage device, whereby the usage rate of power can be reduced in a time period when the electric and electronic devices are used. For example, in the case of the electric refrigerator-freezer 1300, power can be stored in the power storage device 1304 in night time when the temperature is low and the door for a refrigerator 1302 and the door for a freezer 1303 are not often opened or closed. On the other hand, in daytime when the temperature is high and the door for a refrigerator 1302 and the door for a freezer 1303 are frequently opened and closed, the power storage device 1304 is used as an auxiliary power supply; thus, the usage rate of power in daytime can be reduced.

In FIG. 3, a tablet terminal 1400 is an example of an example of an electronic device including a power storage device 1403 that is one embodiment of the present invention. Specifically, the tablet terminal 1400 includes a housing 1401, a housing 1402, a power storage device 1403, and the like. The housings 1401 and 1402 each have a display portion having a touch panel function. By touching the display portion with a finger or the like, contents displayed on the display portion can be controlled. Further, the tablet terminal 1400 can be folded with the housings 1401 and 1402 and the display portion placed inward; thus, the tablet terminal 1400 can be compact and the display portion can be protected. With the use of the power storage device 1403 that is one embodiment of the invention, the tablet terminal 1400 can be compact and used as a mobile application for a long period.

Note that this embodiment can be implemented in appropriate combination with any of the structures of the other embodiments and example.

Example 1

In this example, a negative electrode active material for a power storage device, which is one embodiment of the present invention, was actually manufactured, and the results of evaluating the characteristics are described with reference to FIGS. 4A and 4B, FIGS. 5A and 5B, FIG. 6, FIG. 7, and FIG. 8.

Manufacture of Negative Electrode Active Material

In this example, a spherical phenol resin ("Maririn"0 HF-008; Gun Ei Chemical Industry Co., Ltd.) was used as a raw material of amorphous PAHs. An average grain diameter measured with a particle size analyzer was 9.6 µm.

Then, $SiO_2$ was mixed to the raw material of the amorphous PAHs. Note that $SiO_2$ nanopowder (manufactured by Sigma-Aldrich Corporation) with a grain diameter of 10 nm to 20 nm was used as $SiO_2$.

First, ultrasonic cleaning was conducted in acetone so as to remove organic impurities attached to the spherical phenol resin.

Next, $SiO_2$ nanopowder was added to the cleaned spherical phenol resin, and dry-mixing was performed using a rotatable roller. As shown in Table 1, the additive amounts of $SiO_2$ nanopowder to 5 g of the spherical phenol resin were 0 wt % (0 g, (reference example), 1 wt % (0.05 g), 10 wt % (0.50 g), 20 wt % (1.00 g), and 30 wt % (1.50 g).

TABLE 1

|  | Baking Material | Yield |
| --- | --- | --- |
| 0 wt % addition (Ref.) | Spherical phenol resin (5 g) | 51 |
| 1 w % addition | Spherical phenol resin (5 g) + $SiO_2$ (0.05 g) | 52 |
| 20 wt % addition | Spherical phenol resin (5 g) + $SiO_2$ (1.00 g) | 57 |
| 30 wt % addition | Spherical phenol resin (5 g) + $SiO_2$ (1.50 g) | 59 |

Next, the mixture of the spherical phenol resin and $SiO_2$ nanopowder were baked so as to be a negative electrode active material. The baking was performed at 700° C. using a muffle furnace under a nitrogen atmosphere ($N_2$, 5 L/min) for 10 hours. Table 1 shows the weight yield after the baking.

Figure 4A:
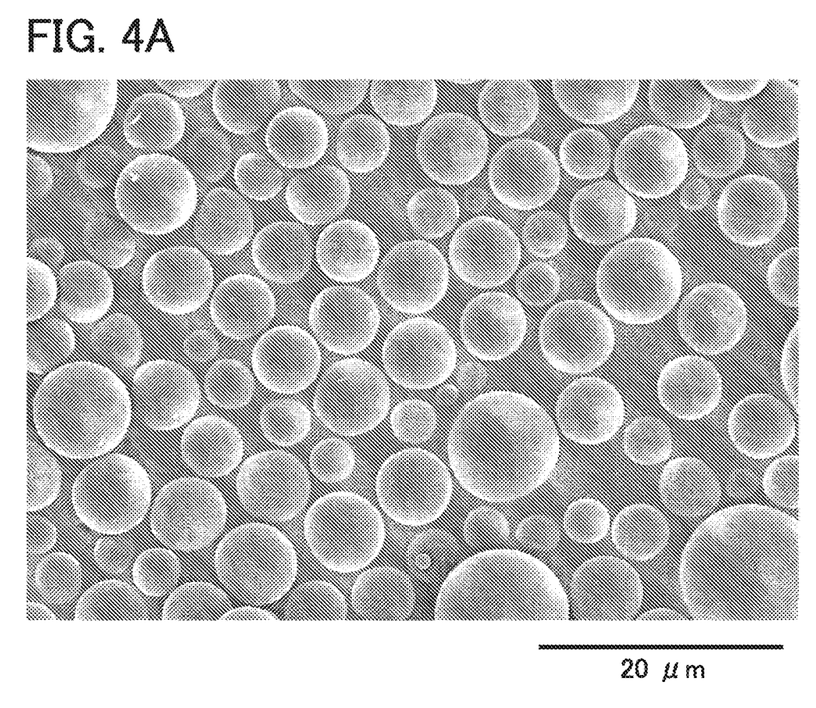
FIGS. 4A and 4B are scanning electron micrograph images each illustrating an example of a negative electrode active material.
Figure 4B:
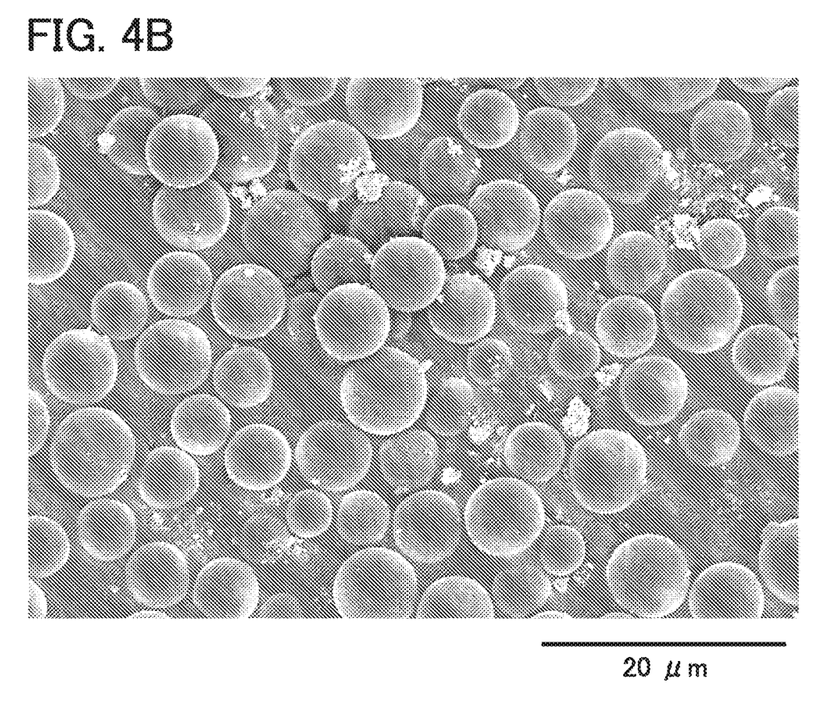
Figure 5A:
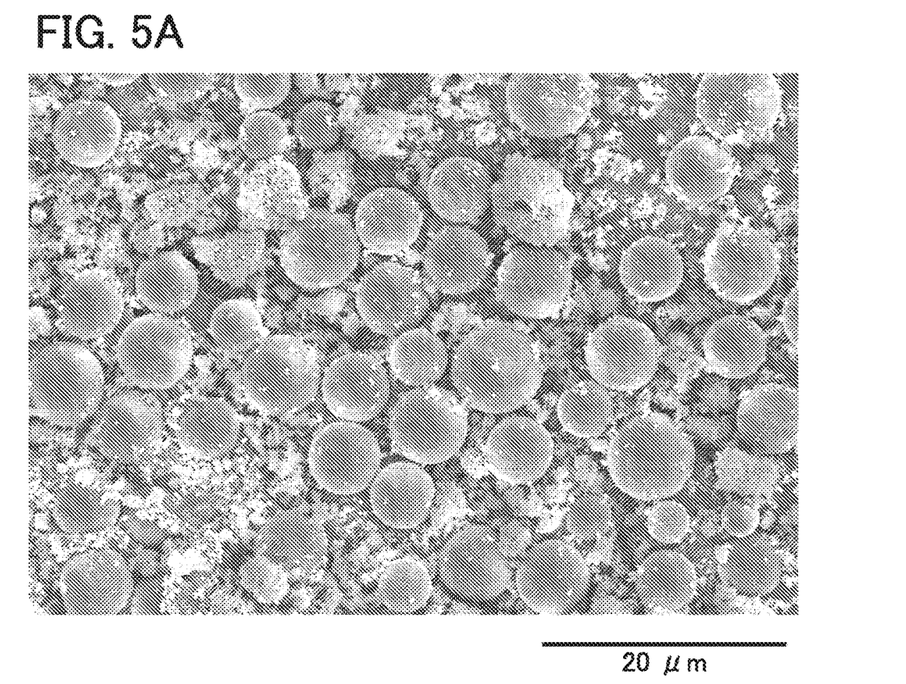
FIGS. 5A and 5B are scanning electron micrograph images each illustrating an example of a negative electrode active material.
Figure 5B:
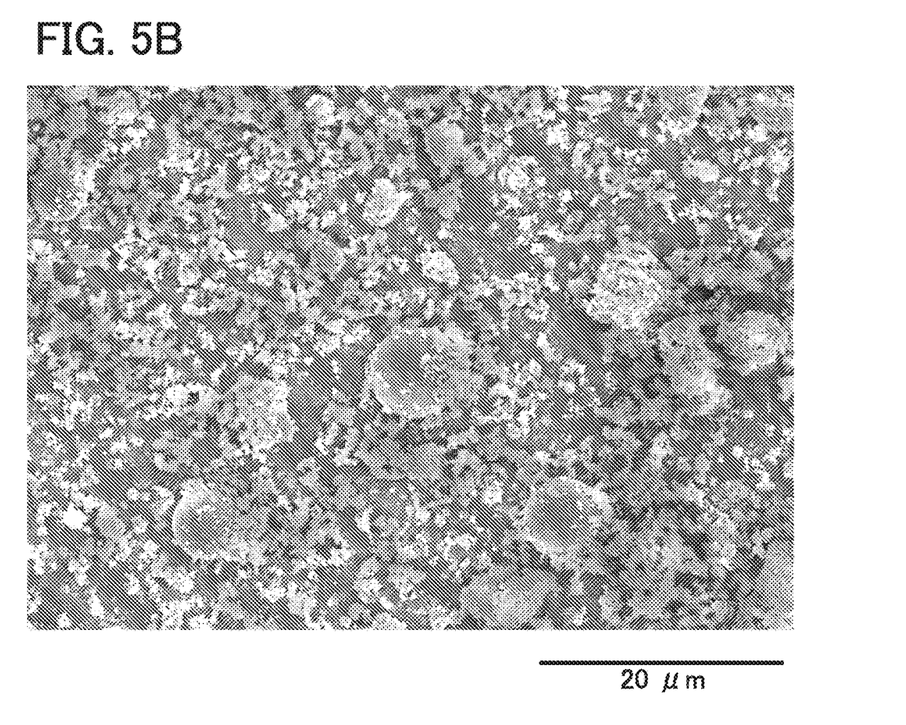

FIGS. 4A and 4B and FIGS. 5A and 5B each show scanning electron micrographs of the negative electrode active materials manufactured in the above manner. FIG. 4A shows the negative electrode active material in which 0 wt % of $SiO_2$ nanopowder (reference example) was added to the spherical phenol resin; FIG. 4B shows the negative electrode active material in which 1 wt % of $SiO_2$ nanopowder was added to the spherical phenol resin; FIG. 5A shows the negative electrode active material in which 20 wt % of $SiO_2$ nanopowder was added to the spherical phenol resin; and FIG. 5B shows the negative electrode active material in which 30 wt % of $SiO_2$ nanopowder was added to the spherical phenol resin. The state where $SiO_2$ nanopowder was attached to the outer surface of the spherical phenol resin was observed in each of FIG. 4B, and FIGS. 5A and 5B.

Manufacture of Negative Electrode

Negative electrodes were manufactured using the above-described negative electrode active materials. For the material of the negative electrode, in addition to the negative electrode active material, acetylene black was used as a conduction auxiliary agent, PVdF was used as a binder, and Cu foil was used as a current collector. The combination ratio of negative electrode active material to acetylene black and PVdF was set to 82:8:10 (wt %).

First, the negative electrode active material and PVdF were mixed using a homogenizer with NMP used as a solvent; then acetylene black was added thereto to be mixed, whereby slurry was formed by adjusting the viscosity using the NMP. After an anchor coat is applied to the Cu foil current collector to a thickness of about 1 µm to 2 µm, the slurry was applied to the Cu foil current collector.

Next, the Cu foil current collector and the slurry were dried at 70° C. for 15 minutes using a circulation drier. This was punched into a round hole with a diameter of 16.15 mm and baked at 170° C. for 10 hours using a vacuum furnace, whereby the negative electrode was obtained.

Table 2 shows the thicknesses and the densities of thus manufactured negative electrodes. The negative electrodes each having a similar thickness and density were manufactured under conditions as shown in Table 2.

TABLE 2

|  | Electrode Thickness | Density |
| --- | --- | --- |
| 0 wt % addition (Ref.) | 44.6 m | 0.88 g/cm³ |
| 1 wt % addition | 41.8 m | 0.92 g/cm³ |
| 10 wt % addition | 41.4 m | 0.90 g/cm³ |
| 20 wt % addition | 43.1 µm | 0.93 g/cm³ |
| 30 wt % addition | 43.8 m | 0.94 g/cm³ |

Evaluation of Negative Electrode

The charge/discharge capacity and efficiency of thus manufactured negative electrodes were measured and charge/discharge characteristics were evaluated.

In order to evaluate the charge/discharge characteristics, a cell was formed using thus manufactured negative electrode as a working electrode and using Li metal with a diameter of 15 mm as the opposite electrode. A glass fiber filter was used as a separator, and an electrolyte in which 1 mol/L lithium hexafluorophosphate ($LiPF_6$) was dissolved in a mixed solution of ethylene carbonate (EC) and ethylmethyl carbonate (EMC) (the volume ratio was 3:7) was used.

A constant-current constant-voltage (CCCV) charging with a current value of 0.2 C (1.3 mA), the lower limit voltage of 1 mV, and an end current of 10 µA was employed for the charging. A constant current (CC) discharging with a current value of 0.2 C (1.3 mA) and the upper limit voltage of 2 V was employed for the discharging.

Figure 6:
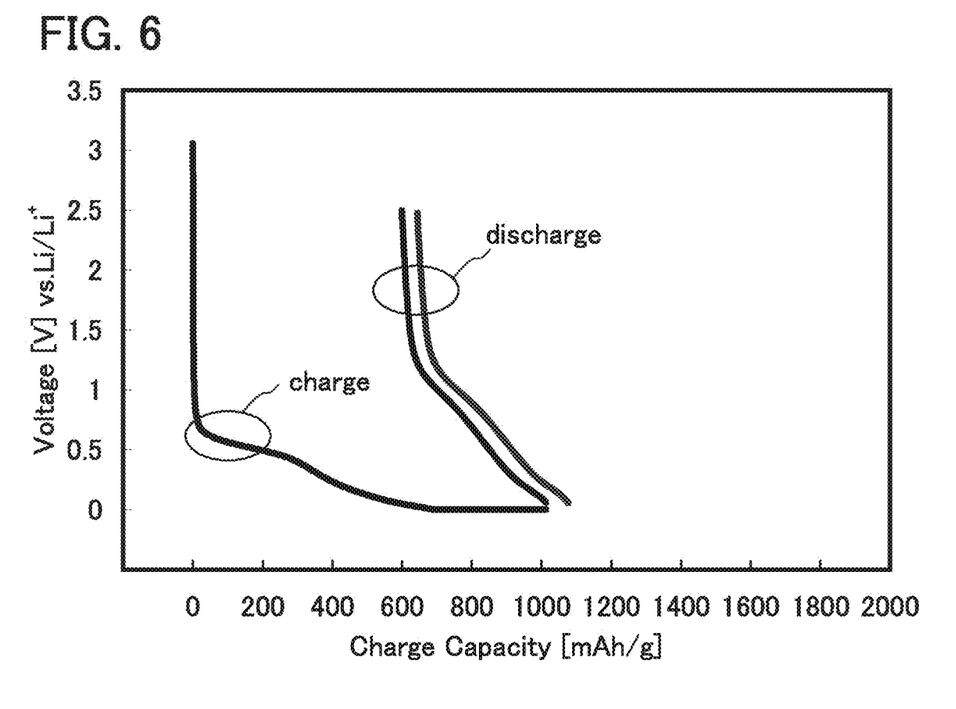
FIG. 6 shows evaluation results of an example of a negative electrode.
Figure 7:
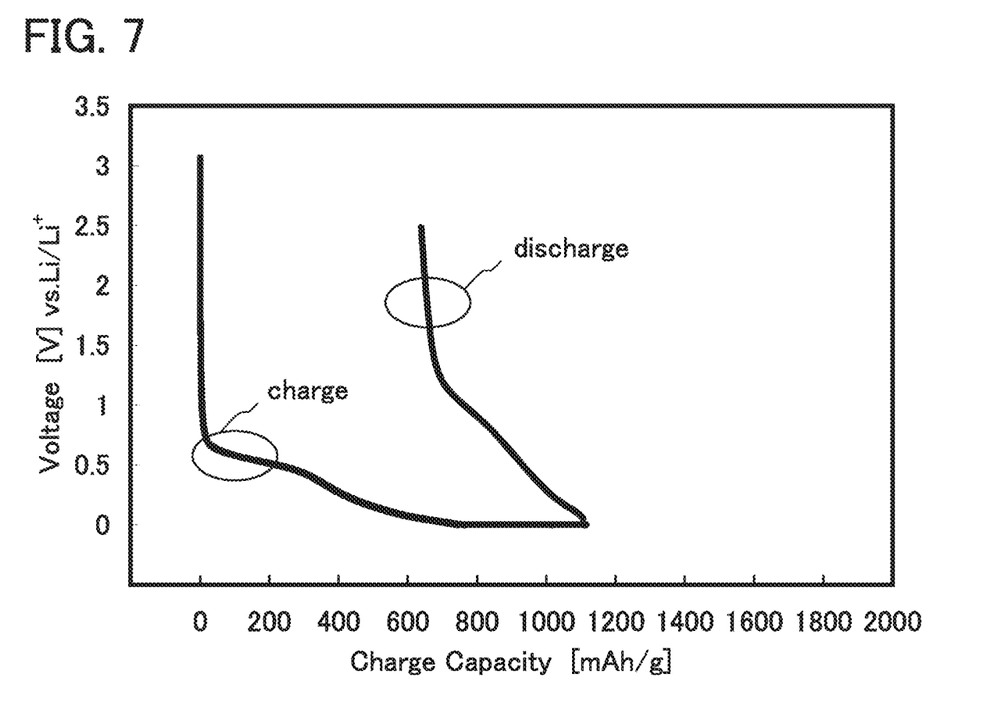
FIG. 7 shows evaluation results of an example of a negative electrode.
Figure 8:
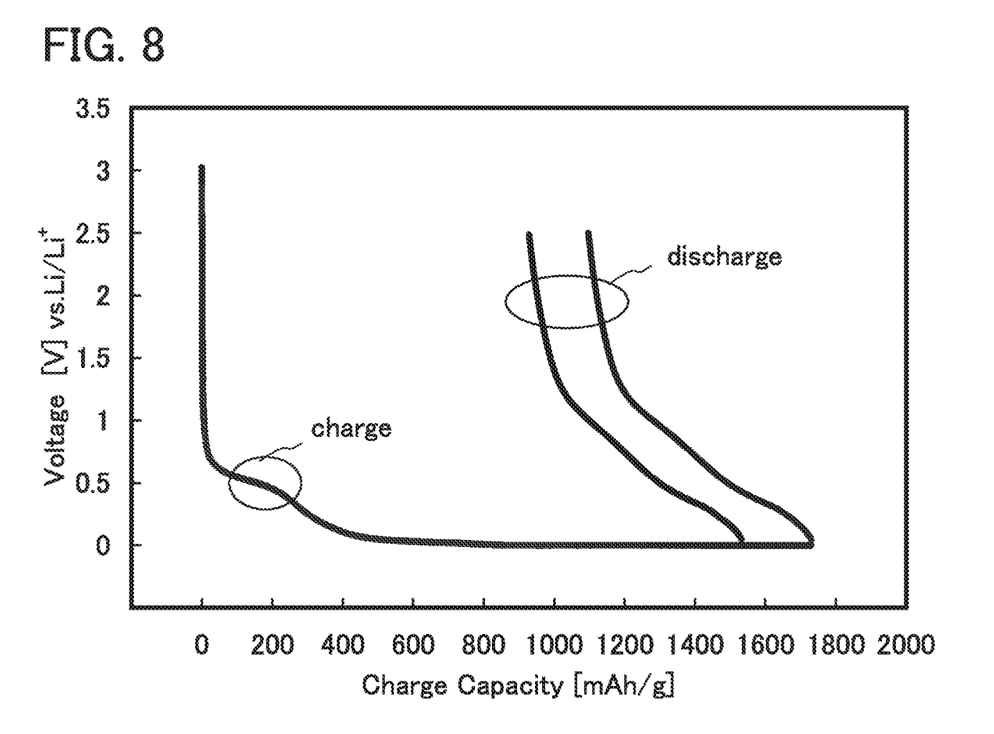
FIG. 8 shows evaluation results of an example of a negative electrode.

FIG. 6. FIG. 7, FIG. 8, and Table 3 each show the results of evaluating the charge/discharge characteristics. FIG. 6 shows the charge/discharge characteristics of the negative electrode using the negative electrode active material in which only the spherical phenol resin was used (0 wt % of $SiO_2$ addition, reference example); FIG. 7 shows the charge/discharge characteristics of the negative electrode using the negative electrode active material in which 1 wt % of SiO$_2$ nanopowder was added to the spherical phenol resin; and FIG. 8 shows the charge/discharge characteristics of the negative electrode using the negative electrode active material in which 30 wt % of SiO$_2$ nanopowder was added to the spherical phenol resin. The measurement was performed using two samples in each case. In each of the graphs, the vertical axis represents voltage and the horizontal axis represents capacity.

TABLE 3

|  | Li Charge Capacity (mAh/g) | Li Discharge Capacity (mAh/g) | Efficiency |
|---|---|---|---|
| 0 wt % addition (Ref.) | 1011.9 | 412.7 | 40.8 |
|  | 1076.7 | 433.2 | 40.2 |
| 1 wt % addition | 1116.6 | 460.5 | 41.2 |
|  | 1106.3 | 467.6 | 42.3 |
| 30 wt % addition | 1532.9 | 604.5 | .4 |
|  | 1730.0 | 633.2 | .6 |

As shown in FIG. 6, in the case of using only the spherical phenol resin (0 wt % of SiO$_2$ addition, reference example), the maximum charge capacity was 1076.7 mAh/g; the maximum discharge capacity was 433.2 mAh/g; and the maximum efficiency was 40.8%

Further, as shown in FIG. 7, in the case of adding 1 wt % of SiO$_2$ nanopowder to the spherical phenol resin, the maximum charge capacity was 1116.6 mAh/g; the maximum discharge capacity was 467.6 mAh/g; and the maximum efficiency was 42.3%.

Furthermore, in the case of adding 30 wt % of SiO$_2$ nanopowder to the spherical phenol resin in FIG. 8, the maximum charge capacity was 1730.0 mAh/g; the maximum discharge capacity was 633.2 mAh/g; and the maximum efficiency was 39.4%.

The results revealed that the charge capacity and discharge capacity were improved by the addition of SiO$_2$ nanopowder to the spherical phenol resin. Moreover, it was revealed that the charge capacity and discharge capacity were much more improved when 30 wt % of SiO$_2$ nanopowder was added than when 1 wt % of SiO$_2$ nanopowder was added.

This application is based on Japanese Patent Application serial no. 2011-189140 filed with Japan Patent Office on Aug. 31, 2011, the entire contents of which are hereby incorporated by reference.

What is claimed is:

1. A method for manufacturing an active material, comprising the steps of:
    mixing a first particle and a second particle to obtain a mixture; and
    baking the mixture under an inert atmosphere at a temperature greater than or equal to 600° C. and less than or equal to 800° C. to form an active material particle comprising a polycyclic aromatic hydrocarbon after mixing the first particle and the second particle,
    wherein the active material particle has a shape that the second particle is attached to an outer surface of the first particle,
    wherein the first particle comprises one selected from the group consisting of a phenol resin, a furfuryl alcohol resin and a saccharide in the mixture,
    wherein the second particle comprises a compound in the mixture, and
    wherein the mixture comprises any one of Sn, Co, Ni, Mn, Fe, V and Si.

2. The method for manufacturing the active material according to claim 1, wherein the second particle comprises any one of CoO, NiO, MnO$_2$ and FePO$_4$.

3. The method for manufacturing the active material according to claim 1,
    wherein the first particle comprises a phenol resin in the mixture, and
    wherein the active material particle comprises a polyacenic material.

4. The method for manufacturing the active material according to claim 1, wherein the mixing of the first particle and the second particle is a dry-mixing.

5. The method for manufacturing an active material according to claim 1, further comprising the step of:
    conducting ultrasonic cleaning of the first particle in an organic solvent before mixing the first particle and the second particle.

6. The method for manufacturing an active material according to claim 5, wherein the organic solvent is acetone.

7. A method for manufacturing an active material, comprising the steps of:
    conducting ultrasonic cleaning of a first particle in an organic solvent;
    mixing the first particle and a second particle to obtain a mixture;
    baking the mixture under an inert atmosphere to form an active material particle comprising a polycyclic aromatic hydrocarbon after mixing the first particle and the second particle,
    wherein the active material particle has a shape that the second particle is attached to an outer surface of the first particle in the active material particle,
    wherein the first particle is a spherical phenol resin particle before and after the ultrasonic cleaning,
    wherein the second particle comprises a compound in the mixture,
    wherein the mixture comprises any one of Sn, Co, Ni, Mn, Fe, V and Si, and
    wherein an amount of the second particle to the first particle is greater than or equal to 1 wt% and less than or equal to 50 wt%.

8. The method for manufacturing an active material according to claim 7, wherein the organic solvent is acetone.

9. The method for manufacturing the active material according to claim 7, wherein the second particle comprises any one of CoO, NiO, MnO$_2$ and FePO$_4$.

10. The method for manufacturing the active material according to claim 7,
    wherein the first particle comprises a phenol resin in the mixture, and
    wherein the active material particle comprises a polyacenic material.

11. The method for manufacturing the active material according to claim 7, wherein the mixing of the first particle and the second particle is a dry-mixing.

* * * * *